United States Patent
Zhang et al.

(10) Patent No.: US 11,224,970 B2
(45) Date of Patent: Jan. 18, 2022

(54) LARGE AREA SURVEILLANCE METHOD AND SURVEILLANCE ROBOT BASED ON WEIGHTED DOUBLE DEEP Q-LEARNING

(71) Applicant: SOOCHOW UNIVERSITY, Suzhou (CN)

(72) Inventors: Zongzhang Zhang, Suzhou (CN); Zhiyuan Pan, Suzhou (CN); Hui Wang, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 752 days.

(21) Appl. No.: 16/081,413

(22) PCT Filed: Apr. 8, 2018

(86) PCT No.: PCT/CN2018/082105
§ 371 (c)(1),
(2) Date: Aug. 30, 2018

(87) PCT Pub. No.: WO2018/205778
PCT Pub. Date: Nov. 15, 2018

(65) Prior Publication Data
US 2021/0205985 A1    Jul. 8, 2021

Related U.S. Application Data

(63) Continuation-in-part of application No. PCT/CT2018/082105, filed on Apr. 8, 2018.

(30) Foreign Application Priority Data

May 11, 2017    (CN) .......................... 201710329549.9

(51) Int. Cl.
*G05B 19/04* (2006.01)
*G05B 19/18* (2006.01)
(Continued)

(52) U.S. Cl.
CPC ............. *B25J 9/163* (2013.01); *B25J 9/1697* (2013.01); *G05B 13/027* (2013.01)

(58) Field of Classification Search
CPC ........ H04N 7/18; G05B 13/027; G06N 20/00; B25J 9/163; B25J 9/1697
See application file for complete search history.

(56) References Cited

U.S. PATENT DOCUMENTS

2010/0094786 A1\* 4/2010 Gupta .................... G06N 20/00
                                                                 706/12
2016/0082597 A1\* 3/2016 Gorshechnikov ...... B25J 9/1664
                                                                 700/253
(Continued)

FOREIGN PATENT DOCUMENTS

| CN | 105867427 A | 8/2016 |
|---|---|---|
| CN | 106598058 A | 4/2017 |
| CN | 107292392 A | 10/2017 |

*Primary Examiner* — Harry Y Oh
(74) *Attorney, Agent, or Firm* — SZDC Law P.C.

(57) ABSTRACT

A large area surveillance method is based on weighted double deep Q-learning. A robot which of Q-value table including a $Q_A$-value table and $Q_B$-value table is provided, an unidentified object enters a large space to trigger the robot, and the robot perceives a current state s and determines whether the current state s is a target state, if yes, the robot reaches a next state and monitors the unidentified object, and if not, the robot reaches a next state, obtains a reward value according to the next state, selectively updates a $Q_A$-value or $Q_B$-value with equal probability, and then updates a Q-value until convergence to obtain an optimal surveillance strategy. The problems of a limited surveillance area and camera capacity are resolved, and the synchronization of multiple cameras doesn't need to be considered, and thus the cost is reduced. A large area surveillance robot is also disclosed.

8 Claims, 2 Drawing Sheets

(51) Int. Cl.
*B25J 9/16* (2006.01)
*G05B 13/02* (2006.01)

(56) References Cited

U.S. PATENT DOCUMENTS

| | | | | |
|---|---|---|---|---|
| 2017/0032245 A1* | 2/2017 | Osband | .................... | G06N 3/08 |
| 2017/0140269 A1* | 5/2017 | Schaul | ................... | G06N 3/088 |
| 2017/0277174 A1* | 9/2017 | Maeda | ............. | G05B 19/41875 |
| 2018/0231985 A1* | 8/2018 | Sun | ........................ | B64D 47/08 |
| 2020/0030970 A1* | 1/2020 | Mariyama | ................ | B25J 9/163 |

* cited by examiner

LARGE AREA SURVEILLANCE METHOD AND SURVEILLANCE ROBOT BASED ON WEIGHTED DOUBLE DEEP Q-LEARNING

This application is the National Stage Application of International Patent Application No. PCT/CN2018/082105, filed on Apr. 8, 2018, which claims priority to Chinese Patent Application No. 201710329549.9, filed on May 11, 2017, which is incorporated by reference for all purposes as if fully set forth herein.

FIELD OF THE INVENTION

The present invention relates to the field of large area surveillance, and more particularly to a large area surveillance method based on weighted double deep Q-learning and a surveillance robot.

DESCRIPTION OF THE RELATED ART

Surveillance systems such as traffic light surveillance at road intersections and security surveillance in residential areas are practically omnipresent in our daily lives. Surveillance systems integrate the knowledge about multimedia technologies, computer networks, industrial control, artificial intelligence, among other things, and may be used for security protection, information acquisition, scheduling and commanding, and the like. Surveillance systems may further provide a variety of services for production procedures and distance education. However, for some large area environments in which specific tasks need to be completed, for example, an unidentified object needs to be found, tracked, and monitored, comprehensive surveillance still cannot be conducted by using current surveillance systems. The reasons mainly lie in two aspects. In the first aspect, a surveillance camera has inherent disadvantages such as the problems of a limited surveillance area and limited information capacity. In the second aspect, the surveillance costs need to be considered. Synchronous monitoring of a plurality of locations using multiple cameras is required for large area surveillance. As a result, the surveillance is difficult, and the costs are high. In conclusion, how to monitor a large-area environment already becomes a problem to be urgently resolved.

Existing surveillance systems have the following disadvantages: (1). The transmission distance of an analog video signal over a cable is limited. When the transmission distance is greater than 1 km, problems such as signal attenuation, distortion, and group delay occur easily, and the picture quality is severely degraded. (2). Information is generally stored in the form of video records in most surveillance systems. However, the capacity is limited by using such a method, and information needs to be regularly uploaded or storage media need to be regularly replaced. As a result, automated surveillance cannot be implemented. (3). Surveillance using a plurality of cameras usually means excessively high costs. Moreover, the synchronization of a plurality of devices has not been considered for existing surveillance cameras.

SUMMARY OF THE INVENTION

The object of the present invention is to provide a large area surveillance method based on weighted double deep Q-learning, so that not only the problem of failing to carry out comprehensive surveillance using a surveillance system because of an excessively large surveillance area is resolved, but also the problem of limited camera capacity is resolved. Moreover, a deep estimation network is used to directly perform feature extraction on image information and determine whether an unidentified object appears in a surveillance area, where features are directly correlated to a Q-value table, so that the synchronization of a plurality of cameras is avoided, and thus the costs are reduced.

To achieve the above purpose, the present invention provides the following technical solutions.

In one aspect, the invention provides a large area surveillance method based on weighted double deep Q-learning, and the method includes the following steps:

S1. providing a large space and a robot in the large space, wherein the robot in a working state reaches a target state from a current state by using a double Q-learning method, a Q-value table of the robot includes a $Q_A$-value table and a $Q_B$-value table, and a Q-value is calculated by using a deep estimation network parameter θ, where an update formula of a $Q_A$-value is as follows:

$$\beta_A = \frac{|Q_B(s', a^*; \theta) - Q_B(s', a_L; \theta)|}{c + |Q_B(s', a^*; \theta) - Q_B(s', a_L; \theta)|},$$

$$\delta = R(s, a) + \gamma[\beta_A Q_A(s', a^*; \theta) + (1 - \beta_A)Q_A(s', a^*; \theta)] - Q_A(s, a; \theta),$$

and $$Q_B \leftarrow Q_B(s, a; \theta) + \alpha(s, a)\delta,$$

an update formula of a $Q_B$-value is as follows:

$$\beta_B = \frac{|Q_A(s', a^*; \theta) - Q_A(s', a_L; \theta)|}{c + |Q_A(s', a^*; \theta) - Q_A(s', a_L; \theta)|},$$

$$\delta = R(s, a) + \gamma[\beta_B Q_B(s', a^*; \theta) + (1 - \beta_B)Q_A(s', a^*; \theta)] - Q_B(s, a; \theta),$$

and $$Q_B \leftarrow Q_B(s, a; \theta) + \alpha(s, a)\delta,$$

where $\beta_A$ and βB represent weights, s' represents a next state, a represents a best action of a next state, $a_L$ represents a worst action of a next state, c is a free parameter and c≥0, δ represents a time differential, R represents a reward value, γ represents a target discount and 0≤γ≤1, s represents the current state, a represents a current action, α represents a learning rate, α is within a range (0, 1), and θ represents the deep estimation network parameter, in the working state, an unidentified object is present in the large space, and in the target state, the unidentified object is in a surveillance area of the robot;

S2. setting an initial state of the robot as the current state s by the robot;

S3. detecting and determining whether the current state s is the working state by the robot, where if not, the process turns to S4, and if yes, the process turns to S5;

S4. switching to standby mode to reach a next state s' by the robot, where the process turns to S11;

S5. detecting and determining whether the current state s is the target state by the robot using a deep estimation network, where if not, the process turns to S6, and if yes, the process turns to S7;

S6. selecting and executing the current action a to reach a next state s' by the robot, where the process turns to S8;

S7. selecting and executing the current action a to reach a next state s' and monitoring the unidentified object by the robot, where the process turns to S8;

S8. obtaining the reward value R according to the next state s' by the robot, where the process turns to S9;

S9. selectively updating the $Q_A$-value or the $Q_B$-value with equal probability by the robot, where the process turns to S10;

S10. determining whether the Q-value table of the robot converges by the robot, where if not, the process turns to S11, and if yes, the process turns to S12;

S11. resetting the next state s' as the current state s by the robot, where the process returns to S3;

S12. formulating an optimal surveillance strategy by the robot, where the process turns to S13;

S13. resetting the next state s' as the current state s by the robot, where the process turns to S14;

S14. detecting and determining whether the current state s is the working state by the robot, where if not, the process turns to S15, and if yes, the process turns to S16;

S15. switching to standby mode to reach a next state s' by the robot, where the process returns to S13;

S16. detecting and determining whether the current state s is the target state by the robot, where if not, the process turns to S17, and if yes, the process turns to S18;

S17. reaching a next state s' according to the optimal surveillance strategy by the robot, where the process returns to S13; and S18. selecting and executing the current action a to reach a next state s' and monitoring the unidentified object by the robot, where the process returns to S13, where in a same large space, the Q-value, the learning rate α, and the target discount γ of the robot, the structure and parameter θ of the deep estimation network, an action selection manner, and the weight β are only initialized before the robot selects and executes the current action a for the first time.

In a weighted double deep Q-learning method, state information such as video images and feedback signals (such as a reward) provided by an environment are input in a deep estimation network. A convolutional layer neural network that may extract spatial structure information is first used to extract feature information of an important target in an image. Nonlinear transformation of a full connected layer is then used to perform classification or regression. Eventually, a Q-value of each action is generated at an output layer. In the network, a reward value and an error item are reduced to a limited range by using a network parameter θ, to ensure that the Q-value is in an appropriate range and improve the stability of the method. In the network, various improvements have been made to a conventional Q-learning algorithm, including: (1). An experience replay mechanism is used during training, and the obtained state transition samples are stored in a memory unit. During training, a small batch of samples is randomly selected from a sample pool to update the network parameter θ, so that the size of the available samples is increased, association between samples is reduced, and the algorithm stability is improved. (2). In addition to the use of a deep network to represent a current Q-value, a target network is further additionally used to generate a target Q-value. A linear combination of the current Q-value and the target Q-value is used to select an action, and a mean squared error between the current Q-value and the target Q-value is minimized to update the network parameter θ. After the target network is introduced, the target Q-value is kept unchanged with a period of time, so that the impact of value fluctuation on a training process is reduced, and the algorithm stability is improved.

In a preferable embodiment, the large space is divided into several subspaces, after selecting and executing the current action a, the robot remains still in a current subspace or moves to a subspace adjacent to the current subspace, and each subspace is not larger than the surveillance area of the robot.

In another preferable embodiment, when the robot detects the current state s, a sensor of the robot is used to acquire an approximate location $loc_i$ of the unidentified object and a precise location $loc_a$ of the robot, denoted as $s=\langle loc_i, loc_a \rangle$.

In a further preferable embodiment, the robot acquires image information by using a camera of the robot, performs feature extraction and classification by using the deep estimation network, and determines by itself whether an unidentified object is present in the surveillance area, if yes, an alarm is raised by an alarm device of the robot.

In a specific embodiment, the robot selects the current action a in an Ú-greedy manner.

In the foregoing technical solution, when the robot selects the current action a, there is a larger probability of selecting an action represented by a maximum Q-value, and there is a smaller probability of selecting any another action.

In the foregoing technical solution, the reward value R is set as follows:

$$R(s, a) = \begin{cases} 10 & loc_i = loc_a \\ -0.1 & loc_i \neq loc_a \end{cases},$$

where $loc_a$ is a precise location of the robot, and $loc_i$ is an approximate location of an unidentified object, that is, when an unidentified object is in the surveillance area of the robot, a positive reward is provided, and when the robot observes no unidentified object, a negative reward is provided.

In a preferable embodiment, the robot keeps updating the learning rate α of the robot, $$\alpha(s, a) = \frac{1}{n(s, a)^{0.8}},$$

where when the robot executes the current action a, an unidentified object also moves to form a double-movement state, and n is the number of executing the action a in the double-movement state.

In another aspect, the invention further provides a large area surveillance robot based on weighted double deep Q-learning, where a Q-value table of the robot includes a $Q_A$-value table and a $Q_B$-value table, and a Q-value is calculated by using a deep estimation network parameter θ, where an update formula of a $Q_A$-value is as follows:

$$\beta_A = \frac{|Q_B(s', a^*; \theta) - Q_B(s', a_L; \theta)|}{c + |Q_B(s', a^*; \theta) - Q_B(s', a_L; \theta)|},$$

$$\delta = R(s, a) + \gamma[\beta_A Q_A(s', a^*; \theta) + (1 - \beta_A) Q_B(s', a^*; \theta)] - Q_A(s, a; \theta),$$

and $$Q_A \leftarrow Q_A(s, a; \theta) + \alpha(s, a)\delta,$$

an update formula of a $Q_B$-value is as follows:

$$\beta_B = \frac{|Q_A(s', a^*; \theta) - Q_A(s', a_L; \theta)|}{c + |Q_A(s', a^*; \theta) - Q_A(s', a_L; \theta)|},$$

$$\delta = R(s, a) + \gamma[\beta_B Q_B(s', a^*; \theta) + (1 - \beta_B)Q_A(s', a^*; \theta)] - Q_B(s, a; \theta),$$

and $$Q_B \leftarrow Q_B(s, a; \theta) + \alpha(s, a)\delta,$$

where $\beta_A$ and $\beta B$ represent weights, S' represents a next state, a represents an optimal action of a next state, $a_L$ represents a worst action of a next state, c is a free parameter and c≥0, δ represents a time differential, R represents a reward value, γ represents a target discount and 0≤γ≤1, S represents the current state, a represents a current action, α represents a learning rate, α is within a range (0, 1), and θ represents the deep estimation network parameter; and In a preferable embodiment, the robot is also provided with a sensor for detecting a precise location of the robot and an approximate location of an unidentified object in real time, and a camera for monitoring the unidentified object. The sensor and the camera are respectively electrically connected to a main control chip of the robot.

In another preferable embodiment, the robot is further provided with an alarm device which is electrically connected to the main control chip of the robot.

By means of the above technical solutions, as compared with the prior art, the present invention has the following advantages:

(1) The large area surveillance method based on weighted double deep Q-learning disclosed in the invention can desirably handle the problem of movement tracking by a robot of a target (an unidentified object) whose movement manner is uncontrolled in a large space. In a weighted double deep Q-learning method, a perceived state is determined, and a risk Q-value in the state is calculated. Subsequently, the robot is guided according to the risk Q-value to select an action to perform movement, to monitor a large area when the intention of a target (an unidentified object) is unknown and it is difficult to determine the behavior of the target (the unidentified object). The weighted double deep Q-learning method is a compromise method between a Q-learning method and a double Q-learning method and used to guide a next action of an Agent. An original Q-learning method may be used for a large-space but cannot deal with a case in which the movement manner of a target is uncontrolled. A double Q-learning method effectively resolves the problem of monitoring a target whose movement manner is uncontrolled, but cannot be applied to a large-area scenario. The weighted double deep Q-learning method can desirably deal with the problem of real-time surveillance in a large-area environment. When the weighted double deep Q-learning method is used to carry out real-time surveillance, a Q-value table needs to be updated. The Q-value table includes a $Q_A$-value table and a $Q_B$-value table. After each action, there is a 50% probability of updating a value in one of the tables. If a value in the $Q_A$-value table needs to be updated, an action having a maximum Q-value is selected from all possible next states in $Q_A$ table, and the action is then used to update values in the $Q_A$-value table and the $Q_B$-value table. Utilization ratio of the $Q_A$-value and the $Q_B$-value table depends on a weight value β. The state of an unidentified object, and the state and a current action of the robot are considered during the calculation of β. A compromise is made between a conventional Q-learning method and a double Q-learning method. In the method of the invention, a difference δ between a target estimate and a current estimate is continuously reduced to eventually reach convergence to obtain an optimal surveillance strategy that can monitor and track an unidentified object.

(2) The robot perceives the location of the robot and an approximate location of an unidentified object in a large space, and reaches a target state by using double Q-learning to carry out surveillance, to acquire image information of the unidentified object and raise an alarm according to the image information.

(3) The robot can perform navigation to track an unidentified object. Therefore, only one robot is needed to complete the surveillance of an entire dangerous area. There is no need to consider the synchronization of a plurality of monitors, and the costs are reduced.

(4) A state perceived by the robot is a state having a Markov property. A future state of a state having a Markov property is only related to a current state and is not related to a previous state. Therefore, a camera does not need to store past information and only needs to focus on the current locations of the robot and an unidentified object. Therefore, the problem of limited information capacity of a camera is resolved, and the costs are reduced.

(5) When the robot performs navigation to track an unidentified object, a reward value is received, and a good case and a bad case can be effectively distinguished according to the reward value, so that the learning speed of the robot is improved, and the tracking of an unidentified object by the robot is facilitated to a certain degree.

(6) The robot chooses whether it is needed to return to a charging point for automatic charging, according to the locations of the robot and a target (an unidentified object).

Where: 10, robot; 11, sensor; 12, camera; 13, main control chip; 20, large space; 21, subspace; 30, unidentified object.

DETAILED DESCRIPTION OF THE PREFERRED EMBODIMENTS

The technical solutions in the embodiments of the present invention will be clearly and completely described in the following with reference to the accompanying drawings. It is obvious that the described embodiments are only illustrative and are not intended to limit the protection scope of the invention.

Based on the embodiments of the present invention, all the other embodiments obtained by those skilled in the art without creative work are within the protection scope of the present invention.

Embodiment 1

Figure 1:
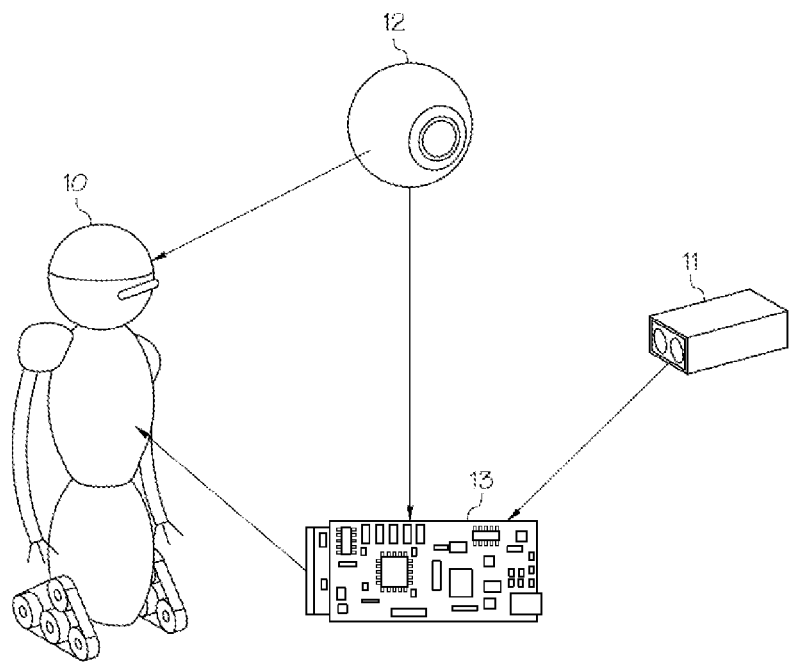
FIG. 1 is a schematic view of a large area surveillance robot based on weighted double deep Q-learning according to the present invention.

Referring to FIG. 1, a large area surveillance robot 10 based on weighted double deep Q-learning is illustrated. A Q-value table of the robot 10 includes a $Q_A$-value table and a $Q_B$-value table, and a Q-value is calculated by using a deep estimation network parameter θ.

An update formula of a $Q_A$-value is as follows:

$$\beta_A = \frac{|Q_B(s', a^*; \theta) - Q_B(s', a_L; \theta)|}{c + |Q_B(s', a^*; \theta) - Q_B(s', a_L; \theta)|},$$

$$\delta = R(s, a) + \gamma[\beta_A Q_A(s', a^*; \theta) + (1 - \beta_A)Q_B(s', a^*; \theta)] - Q_A(s, a; \theta),$$

and $$Q_A \leftarrow Q_A(s, a; \theta) + \alpha(s, a)\delta,$$

an update formula of a $Q_B$-value is as follows:

$$\beta_B = \frac{|Q_A(s', a^*; \theta) - Q_A(s', a_L; \theta)|}{c + |Q_A(s', a^*; \theta) - Q_A(s', a_L; \theta)|},$$

$$\delta = R(s, a) + \gamma[\beta_B Q_B(s', a^*; \theta) + (1 - \beta_B)Q_A(s', a^*; \theta)] - Q_B(s, a; \theta),$$

and $$Q_B \leftarrow Q_B(s, a; \theta) + \alpha(s, a)\delta,$$

where $\beta_A$ and βB represent weights, s' represents a next state, a* represents a best action of a next state, $a_L$ represents a worst action of a next state, c is a free parameter and c≥0, δ represents a time differential, R represents a reward value, γ represents a target discount and 0≤γ≤1, s represents a current state, a represents a current action, α represents a learning rate, α is within a range (0, 1), and θ represents the deep estimation network parameter.

The robot 10 is further provided with a sensor 11 for detecting a precise location of the robot 10 and an approximate location of an unidentified object in real time, and a camera 12 for monitoring the unidentified object. The sensor 11 and the camera 12 are respectively electrically connected to a main control chip 13 of the robot 10.

After the robot 10 acquires an image, the image is used as an input for a deep estimation network. The deep estimation network is an 8-layer network. All network nodes are rectified linear units (ReLU). Layer 1 is an input layer, the state is a flat vector whose length is 84*84*3=21168, and a reward signal is a numeric scalar. Layer 2 to Layer 5 are convolutional layers. In Layer 2, the convolutional kernel size is 8*8, the step size is 4*4, the number of output channels is 32, and the output dimension of this layer is 20*20*32. In Layer 3, the convolutional kernel size is 4*4, the step size is 2*2, the number of output channels is 64, and the output dimension of this layer is 9*9*64. In Layer 4, the convolutional kernel size is 3*3, the step size is 1*1, the number of output channels is 64, and the output dimension of this layer is 7*7*64. In Layer 5, the convolutional kernel size is 7*7, the step size is 1*1, and the number of output channels is 1*1*512. Layer 7 is a full connected layer, and the number of output channels is 512. Layer 8 is also a full connected layer, and the number of output channels is the number of actions, that is, an output-value is a Q-value corresponding to each state-action pair. In an experience replay mechanism, the number of each batch of samples is 32, the size of a memory replay unit is 1000000, a target Q-value is updated once for every 10000 samples, and a current Q-value is updated once for every several samples whose quantity is the number of actions.

Figure 2:
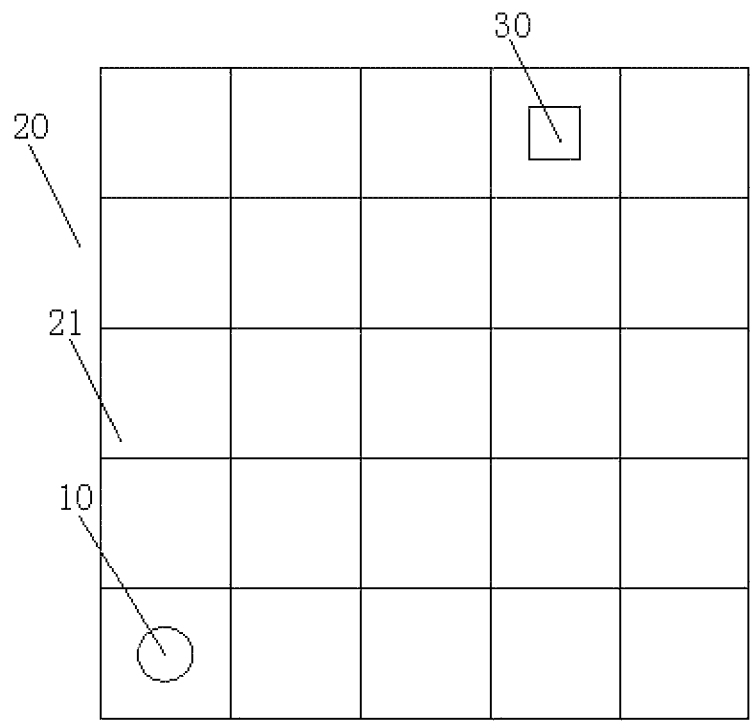
FIG. 2 is a schematic view of a large space and the locations of a robot and an unidentified object based on weighted double deep Q-learning according to the present invention.
Figure 3:
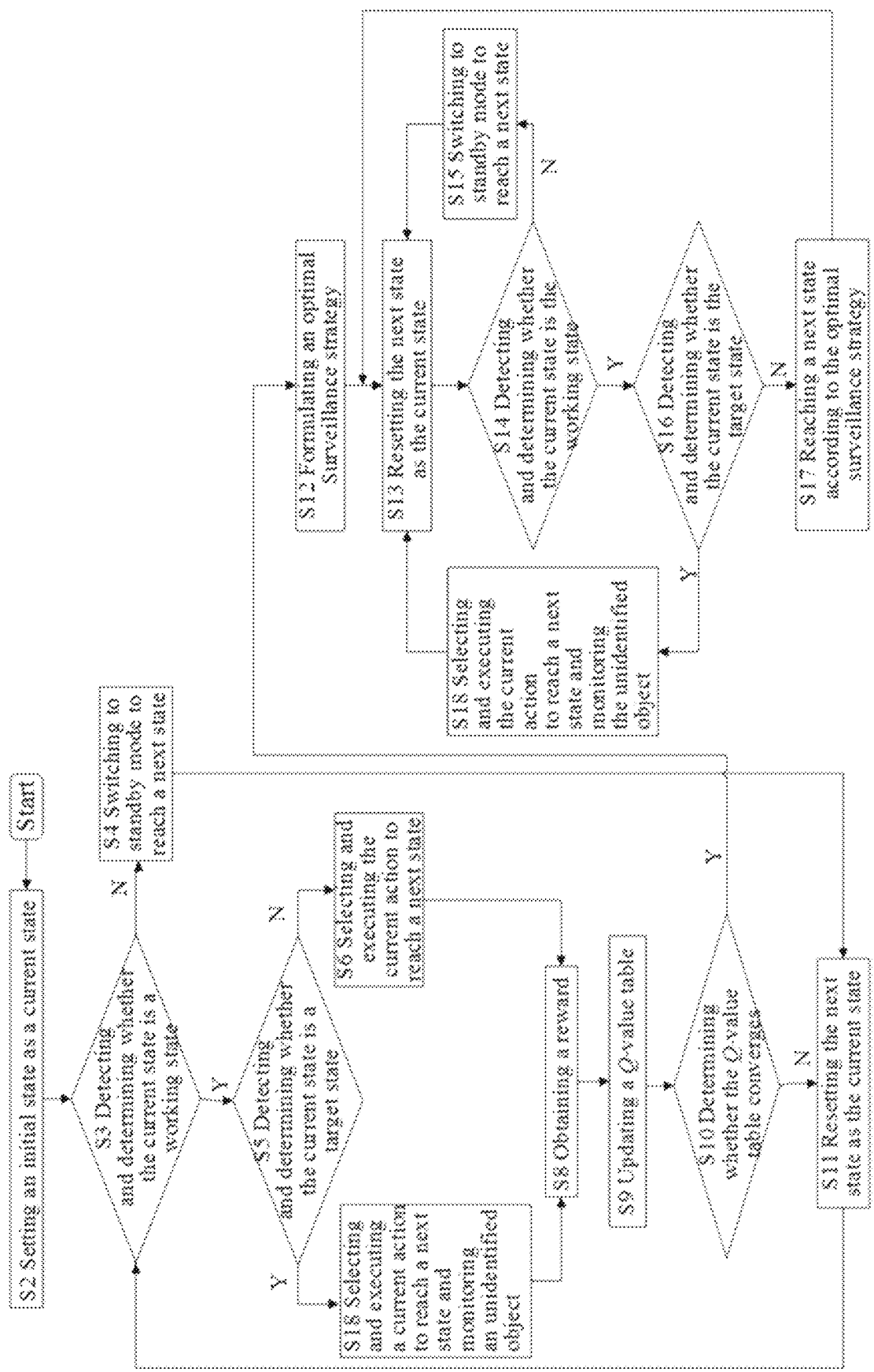
FIG. 3 is a flowchart of a large area surveillance method based on weighted double deep Q-learning according to the present invention.

Referring to FIG. 2 and FIG. 3, a large area surveillance method based on weighted double deep Q-learning is illustrated, and the method includes the following steps:

S1. A large space 20 and a robot 10 in the large space 20 are provided, the robot 10 in a working state reaches a target state from a current state by using a double Q-learning method;

in the working state, an unidentified object 30 is present in the large space 20;

in the target state, the unidentified object 30 is in a surveillance area of the robot 10;

S2. the robot 10 sets its initial state as the current state s.

S3. the robot 10 detects and determines whether the current state s is the working state, where if not, the process turns to S4, and if yes, the process turns to S5;

S4. the robot 10 switches to standby mode to reach a next state s', where the process turns to S11;

S5. the robot 10 detects and determines whether the current state s is the target state, if not, the process turns to S6, and if yes, the process turns to S7;

S6. the robot 10 selects and executes the current action a to reach a next state s', where the process turns to S8;

S7. the robot 10 selects and executes the current action a to reach a next state s' and monitors the unidentified object 30, where the process turns to S8;

S8. the robot 10 obtains a reward value R according to the next state s' where the process turns to S9;

S9. the robot 10 selectively updates a $Q_A$-value or a $Q_B$-value with equal probability, where the process turns to S10;

S10. the robot 10 determines whether the Q-value table of the robot 10 converges, where if not, the process turns to S11, and if yes, the process turns to S12;

S11. the robot 10 resets a next state s' as the current state s, where the process returns to S3;

S12. the robot 10 formulates an optimal surveillance strategy, where the process turns to S13;

S13. the robot 10 resets a next state s' as the current state s, where the process turns to S14;

S14. the robot 10 detects and determines whether the current state s is the working state using a deep estimation network, where if not, the process turns to S15, and if yes, the process turns to S16;

S15. the robot 10 switches to standby mode to reach a next state s, where the process turns to S13;

S16. the robot 10 detects and determines whether the current state s is the target state, where if not, the process turns to S17, and if yes, the process turns to S18;

S17. the robot 10 reaches a next state s' according to the optimal surveillance strategy, where the process returns to S13; and S18. the robot 10 selects and executes the current action a to reach a next state s, and monitors the unidentified object 30, where the process returns to S13.

In the above technical solution, in a same large space, the Q-value, the learning rate α, and the target discount γ of the robot, an action selection manner, the weight β, and the structure and parameter θ of the deep estimation network, and the like are only initialized before the robot 10 selects and executes the current action a for the first time. In this embodiment, after initialization, the Q-value is 0, the free parameter c is 1, the learning rate α is 0.8, the target discount γ is 0.95, the action selection manner is an Ú-greedy manner, and the weight β is 0.5.

In the above technical solution, the large space 20 is divided into several subspaces 21. After selecting and executing the current action a, the robot 10 remains still in a current subspace or moves to a subspace adjacent to the current subspace. Each subspace 21 is not larger than the surveillance area of the robot 10.

In the above technical solution, when the robot 10 detects the current state s, a sensor of the robot 10 is used to acquire an approximate location $loc_i$ of the unidentified object 30 and a precise location $loc_a$ of the robot 10, denoted as s= $\langle loc_i, loc_a \rangle$. The foregoing state has a Markov property. A future state of a state having a Markov property is only related to a current state and is not related to a previous state.

In the above technical solution, when the robot 10 monitors the unidentified object 30, a camera 12 of the robot 10 is used to acquire image information of the unidentified object.

In the above technical solution, when the robot 10 selects the current action a, there is a larger probability of selecting an action represented by a maximum Q-value, and there is a smaller probability of selecting any another action.

In one embodiment, the camera 12 of the robot 10 is a 360-degree rotatable camera.

In another embodiment, an alarm device (not shown) is further disposed on the robot 10. The alarm device is electrically connected to the main control chip 13 of the robot 10. The robot 10 performs feature extraction and classification by using the deep estimation network according to the image information and determines by itself whether an unidentified object is present in the surveillance area, where if yes, an alarm is raised by using the alarm device of the robot.

In a further embodiment, the robot 10 selects the current action a in an Ú-greedy manner. The action refers to a movement direction of the robot 10, that is, upward movement, downward movement, leftward movement, rightward movement, and stillness.

In one embodiment, the reward value R is set as follows:

$$R(s, a) = \begin{cases} 10 & loc_i = loc_a \\ -0.1 & loc_i \neq loc_a \end{cases},$$

where $loc_a$ is a precise location of the robot, and $loc_i$ is an approximate location of an unidentified object, that is, when an unidentified object is in the surveillance area of the robot, a positive reward is provided, and when the robot observes no unidentified object, a negative reward is provided.

In a further embodiment, the robot 10 keeps updating the learning rate $\alpha$ of the robot 10, $$\alpha(s, a) = \frac{1}{n(s, a)^{0.8}},$$

where when the robot executes the current action a, an unidentified object also moves to form a double-movement state, and n is the number of executing the action a in the double-movement state. The abovementioned description of the disclosed embodiments enables those skilled in the art to implement or use the present invention. Multiple modifications to these embodiments are obvious to those skilled in the art, and general principles defined herein can be implemented in other embodiments without departing from the spirit or scope of the present invention. Therefore, the present invention will not be limited to theses embodiments illustrated herein, but needs to be in line with the widest scope consistent with the principles and novel features disclosed herein.

What is claimed is:

1. A large area surveillance method based on weighted double deep Q-learning, comprising steps of:

S1. providing a large space and a robot in the large space, wherein the robot in a working state reaches a target state from a current state by using a double Q-learning method, a Q-value table of the robot comprises a $Q_A$-value table and a $Q_B$-value table, and a Q-value is calculated by using a deep estimation network parameter θ, an update formula of a $Q_A$-value being as follows:

$$\beta_A = \frac{|Q_B(s', a^*; \theta) - Q_B(s', a_L; \theta)|}{c + |Q_B(s', a^*; \theta) - Q_B(s', a_L; \theta)|},$$

$$\delta = R(s, a) + \gamma[\beta_A Q_A(s', a^*; \theta) + (1 - \beta_A)Q_B(s', a^*; \theta)] - Q_A(s, a; \theta),$$

and $$Q_A \leftarrow Q_A(s, a; \theta) + \alpha(s, a)\delta,$$

an update formula of a $Q_B$-value being as follows:

$$\beta_B = \frac{|Q_A(s', a^*; \theta) - Q_A(s', a_L; \theta)|}{c + |Q_A(s', a^*; \theta) - Q_A(s', a_L; \theta)|},$$

$$\delta = R(s, a) + \gamma[\beta_B Q_B(s', a^*; \theta) + (1 - \beta_B)Q_A(s', a^*; \theta)] - Q_B(s, a; \theta),$$

and $$Q_B \leftarrow Q_B(s, a; \theta) + \alpha(s, a)\delta,$$

wherein $\beta_A$ and $\beta_B$ represent weights, s' represents a next state, a* represents an optimal action of a next state, $a_L$ represents a worst action of a next state, c is a free parameter and c≥0, δ represents a time differential, R represents a reward value, γ represents a target discount and 0≤γ≤1, s represents the current state, a represents a current action, α represents a learning rate, α is within a range (0, 1), and θ represents the deep estimation network parameter, in the working state, an unidentified object is present in the large space, and in the target state, the unidentified object is in a surveillance area of the robot;

S2. setting an initial state of the robot as the current state s by the robot;

S3. detecting and determining whether the current state s is the working state by the robot, wherein if not, the process turns to S4, and if yes, the process turns to S5;

S4. switching to standby mode to reach a next state s' by the robot, wherein the process turns to S11;

S5. detecting and determining whether the current state s is the target state by the robot, wherein if not, the process turns to S6, and if yes, the process turns to S7;

S6. selecting and executing the current action a to reach a next state s' by the robot, wherein the process turns to S8;

S7. selecting and executing the current action a to reach a next state s' and monitoring the unidentified object by the robot, wherein the process turns to S8;

S8. obtaining the reward value R according to the next state s' by the robot, wherein the process turns to S9;

S9. selectively updating the $Q_A$-value or the $Q_B$-value with equal probability by the robot, wherein the process turns to S10;

S10. determining whether the Q-value table of the robot converges by the robot, wherein if not, the process turns to S11, and if yes, the process turns to S12;

S11. resetting the next state s' as the current state s by the robot, wherein the process returns to S3;

S12. formulating an optimal surveillance strategy by the robot, wherein the process turns to S13;

S13. resetting the next state s' as the current state s by the robot, wherein the process turns to S14;

S14. detecting and determining whether the current state s is the working state by the robot, wherein if not, the process turns to S15, and if yes, the process turns to S16;

S15. switching to standby mode to reach a next state s' by the robot, wherein the process returns to S13;

S16. detecting and determining whether the current state s is the target state by the robot using a deep estimation network, wherein if not, the process turns to S17, and if yes, the process turns to S18;

S17. reaching a next state s' according to the optimal surveillance strategy by the robot, wherein the process returns to S13; and S18. selecting and executing the current action a to reach a next state s', and monitoring the unidentified object by the robot, wherein the process returns to S13, wherein in the large space, the Q-value, the learning rate α, and the target discount γ of the robot, the structure and parameter θ of the deep estimation network, an action selection manner, and the weight β are only initialized before the robot selects and executes the current action a for the first time.

2. The large area surveillance method based on weighted double deep Q-learning as claimed in claim 1, wherein the large space is divided into several subspaces, after selecting and executing the current action a, the robot remains still in a current subspace or moves to a subspace adjacent to the current subspace, and each subspace being less than or equal to the surveillance area of the robot.

3. The large area surveillance method based on weighted double deep Q-learning as claimed in claim 1, wherein when the robot detects the current state s, a sensor of the robot is used to acquire an approximate location $loc_i$ of the unidentified object and a precise location $loc_a$ of the robot, denoted as $s=\langle loc_i, loc_a \rangle$.

4. The large area surveillance method based on weighted double deep Q-learning as claimed in claim 1, wherein the robot acquires image information by using a camera of the robot, performs feature extraction and classification by using the deep estimation network, and determines by itself whether an unidentified object is present in the surveillance area.

5. The large area surveillance method based on weighted double deep Q-learning as claimed in claim 1, wherein when the robot selects the current action a, there is a larger probability of selecting an action represented by a maximum Q-value, and there is a smaller probability of selecting any another action.

6. The large area surveillance method based on weighted double deep Q-learning as claimed in claim 1, wherein the reward value R is set as follows:

$$R(s, a) = \begin{cases} 10 & loc_i = loc_a \\ -0.1 & loc_i \neq loc_a \end{cases},$$

wherein $loc_a$ is a precise location of the robot, and $loc_i$ is an approximate location of an unidentified object, that is, when the unidentified object is in the surveillance area of the robot, a positive reward is provided, and when the robot does not observe the unidentified object, a negative reward is provided.

7. The large area surveillance method based on weighted double deep Q-learning as claimed in claim 1, wherein the robot keeps updating the learning rate α of the robot, $$\alpha(s, a) = \frac{1}{n(s, a)^{0.8}},$$

wherein when the robot executes the current action a, an unidentified object also moves to form a double-movement state, and n is the number of executing the action a in the double-movement state.

8. A large area surveillance robot based on weighted double deep Q-learning, wherein a Q-value table of the robot comprises a $Q_A$-value table and a $Q_B$-value table, and a Q-value is calculated by using a deep estimation network parameter θ, wherein an update formula of a $Q_A$-value is as follows:

$$\beta_A = \frac{|Q_B(s', a^*; \theta) - Q_B(s', a_L; \theta)|}{c + |Q_B(s', a^*; \theta) - Q_B(s', a_L; \theta)|},$$

$$\delta = R(s, a) + \gamma[\beta_A Q_A(s', a^*; \theta) + (1 - \beta_A)Q_B(s', a^*; \theta)] - Q_A(s, a; \theta),$$

and $$Q_A \leftarrow Q_A(s, a; \theta) + \alpha(s, a)\delta,$$

an update formula of a $Q_B$-value is as follows:

$$\beta_B = \frac{|Q_A(s', a^*; \theta) - Q_A(s', a_L; \theta)|}{c + |Q_A(s', a^*; \theta) - Q_A(s', a_L; \theta)|},$$

$$\delta = R(s, a) + \gamma[\beta_B Q_B(s', a^*; \theta) + (1 - \beta_B)Q_A(s', a^*; \theta)] - Q_B(s, a; \theta),$$

and $$Q_B \leftarrow Q_B(s, a; \theta) + \alpha(s, a)\delta,$$

wherein $\beta_A$ and $\beta_B$ represent weights, s' represents a next state, a* represents an optimal action of a next state, $a_L$ represents a worst action of a next state, c is a free parameter and c≥0, δ represents a time differential, R represents a reward value, γ represents a target discount, and 0≤γ≤1, s represents the current state, a represents a current action, α represents a learning rate, α is within a range (0, 1), and θ represents the deep estimation network parameter; and the robot is also provided with a sensor for detecting a precise location of the robot and an approximate location of an unidentified object in real time, and a camera for monitoring the unidentified object, the sensor and the camera being respectively electrically connected to a main control chip of the robot.

* * * * *